(12) United States Patent
Gupta et al.

(10) Patent No.: US 7,870,127 B2
(45) Date of Patent: *Jan. 11, 2011

(54) AUTOMATED METHOD AND SYSTEM TO CALCULATE THE SURFACE DISTANCE BETWEEN TWO GEOGRAPHICAL LOCATIONS, AND TO FILTER A DATA SET BASED ON THE CALCULATION

(75) Inventors: Raghav Gupta, Sunnyvale, CA (US); Richard D. Henderson, San Jose, CA (US)

(73) Assignee: eBay Inc., San Jose, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/129,567

(22) Filed: May 29, 2008

(65) Prior Publication Data

US 2008/0228399 A1    Sep. 18, 2008

Related U.S. Application Data

(63) Continuation of application No. 10/867,953, filed on Jun. 14, 2004, now Pat. No. 7,395,257.

(51) Int. Cl.
G06F 17/30 (2006.01)
(52) U.S. Cl. .................................................. 707/724
(58) Field of Classification Search .................. None
See application file for complete search history.

(56) References Cited

U.S. PATENT DOCUMENTS

| 5,499,366 | A | 3/1996 | Rosenberg et al. |
| 5,552,794 | A | 9/1996 | Colley et al. |
| 7,395,257 | B2 | 7/2008 | Gupta et al. |
| 2001/0051856 | A1 | 12/2001 | Niu et al. |
| 2001/0055025 | A1 * | 12/2001 | Deering et al. ............. 345/611 |
| 2002/0087684 | A1 * | 7/2002 | Foth ........................... 709/225 |
| 2004/0002814 | A1 | 1/2004 | Gogic |
| 2005/0278117 | A1 | 12/2005 | Gupta et al. |

OTHER PUBLICATIONS

Wattenberg, "Spherical Coordinates," Department of Mathematics, Montana State University, 1997 <http://www.math.montana.edu/frankw/ccp/multiworld/multipleIVP/spherical/body.htm>.*
Chamberlain, "Q5.1: What is the best way to calculate the distance between 2 points?", Feb. 2001 <http://www.usenet-replayer.com/faq/comp.infosystems.gis.html>.*
U.S. Appl. No. 10/867,953, Response filed Nov. 7, 2007 to Non-Final Office Action mailed Aug. 10, 2007, 15 pgs.
Chamberlain, "Q5.1: What is the best way to calculate the distance between 2 points?", http://www.usenet-replayer.com/faq/comp.infosystems.gis.html, (Feb. 2001).
Dana, P. H, "Coordinate System Overview", Http://www.colorado.edu/geography/gcraft/notes/coordsys/coordsys.html, (Dec. 15, 1999).
Wattenberg, "Spherical Coordinates", http://www.math.montana.edu/frankw/ccp/multiworld/multipleIVP/spherical/body.htm#converting, Department of Mathematics, Montana State University,, (1997).

* cited by examiner

*Primary Examiner*—Tim T. Vo
*Assistant Examiner*—Aaron Sanders
(74) *Attorney, Agent, or Firm*—Schwegman, Lundberg Woessner, P.A.

(57) ABSTRACT

A method and apparatus for calculating the surface distance between two geographical locations are described. According to one aspect of the present invention, values are stored in a square look-up table for determining the square of a value. Also, values are stored in a square of linear to surface distance look-up table for determining the surface distance of a linear value. Cartesian co-ordinates of the two geographic locations and the square look-up table are then used to calculate the square of the linear distance between the two geographical locations and the square of linear to surface distance look-up table is used to convert the calculated square of the linear distance to a surface distance.

19 Claims, 4 Drawing Sheets

AUTOMATED METHOD AND SYSTEM TO CALCULATE THE SURFACE DISTANCE BETWEEN TWO GEOGRAPHICAL LOCATIONS, AND TO FILTER A DATA SET BASED ON THE CALCULATION

RELATED APPLICATIONS

The present application is a continuation of U.S. patent application Ser. No. 10/867,953 filed on Jun. 14, 2004 now U.S. Pat. No. 7,395,257 and entitled "AUTOMATED METHOD AND SYSTEM TO CALCULATE THE SURFACE DISTANCE BETWEEN TWO GEOGRAPHICAL LOCATIONS, AND TO FILTER A DATA SET BASED ON THE CALCULATION", which application is incorporated herein by reference in its entirety.

BACKGROUND OF THE INVENTION

An embodiment relates to a method and system to calculate the surface distance between two geographical locations, and to the automated filtering of a data set based on calculated geographic distances.

SUMMARY OF THE INVENTION

In one embodiment, a method and apparatus for calculating the surface distance between two geographical locations, values are stored in a square look-up table for determining the square of a value. Also, values are stored in a square of linear to surface distance look-up table for determining the surface distance of a linear value. Cartesian co-ordinates of the two geographic locations and the square look-up table are then used to calculate the square of the linear distance between the two geographical locations and the linear to surface distance look-up table is used to convert the calculated square of the linear distance to a surface distance.

According to another aspect of the present invention, a computer readable medium is provided which comprises instructions, which when executed on a processor, cause the processor to perform the abovementioned method.

DESCRIPTION OF AN EMBODIMENT

In the following description, for purposes of explanation, numerous specific details are set forth in order to provide a thorough understanding of the present invention. It will be evident, however, to one skilled in the art that the present invention may be practiced without these specific details.

Figure 1:
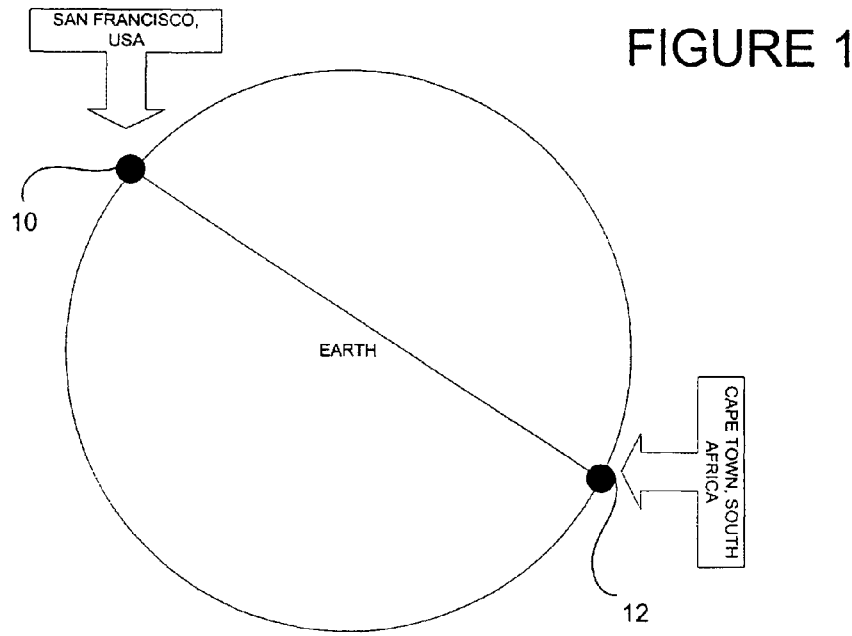
FIG. 1 is a schematic illustration of two geographic locations and the distance between them to be calculated using an exemplary embodiment of the present invention.

Referring to FIG. 1, an exemplary embodiment relates to a method of calculating the surface distance between two geographical locations, for example, the surface distance between San Francisco 10 and Cape Town 12.

It will be appreciated that this is for exemplary purposes only and that the present invention can be used to calculate the surface distance between any two geographical locations including locations that are much closer to one another then the locations illustrated in FIG. 1.

Figure 2:
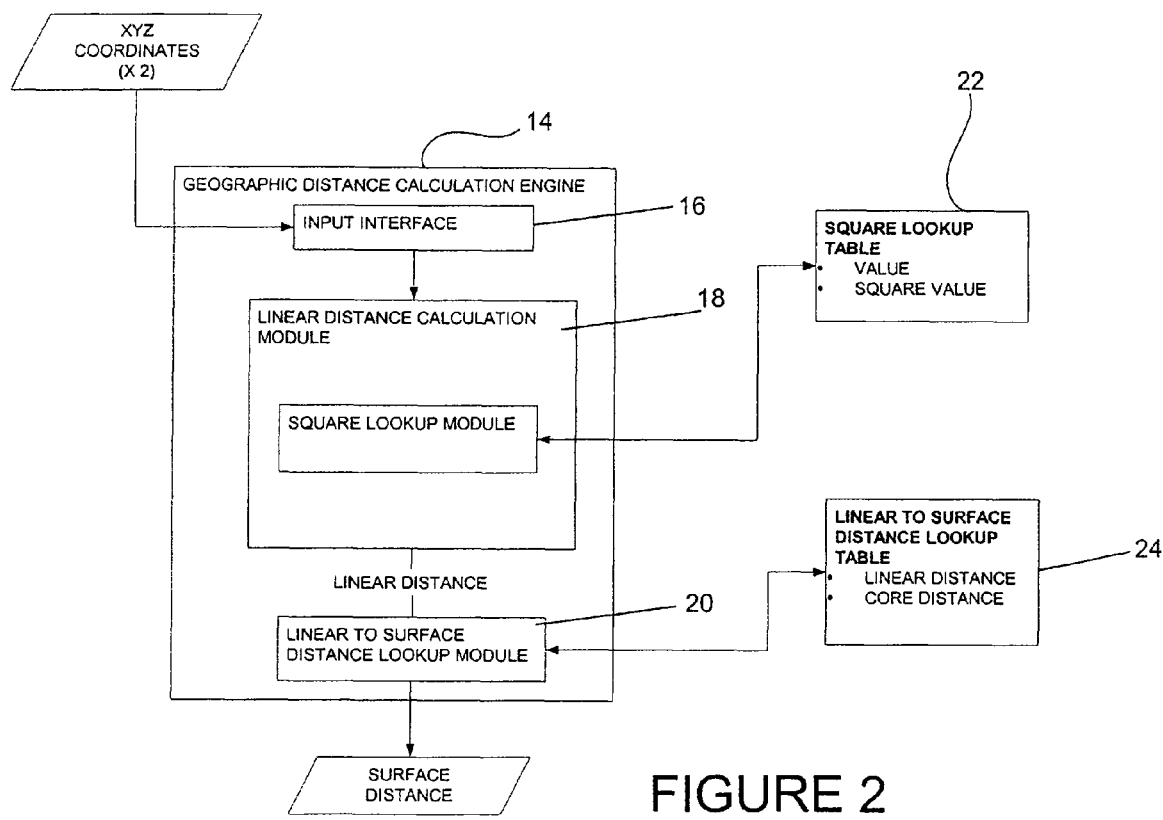
FIG. 2 is a schematic illustration of the modules and data structures of an exemplary embodiment of the present invention.

Referring to FIG. 2, the figure illustrates schematically a distance calculation engine 14 which is a software implemented engine comprising an input interface module 16, a linear distance calculation module 18 and a linear to surface distance look up module 20.

The software uses data stored in the data tables schematically illustrated in the figure, being a square look-up table 22, and a square of linear to surface distance look-up table 24. The square look-up table 22 stores values for determining the square value. The square of linear to surface distance look-up table 24 stores values to convert the square of the linear distance to a surface distance.

In operation, the distance calculation engine 14 is passed the Cartesian co-ordinates $(x_1, y_1, z_1)$ and $(x_2, y_2, z_2)$ of the two geographic locations.

These co-ordinates can either be received directly from a user requesting a distance calculation or alternatively the co-ordinates can be obtained by mapping the earth onto a Cartesian plane so that each geographic location on the earth is allocated Cartesian co-ordinates.

The (x,y,z) are initially calculated assuming the center of the earth as (0,0,0), which gives x,y,z for any point on the earth in the range of −R to +R, where R is the radius of the earth. For data normalization purposes, R is added to each of x,y and z so that the range of each becomes from 0 to +2R, which is the same as 0 to D (D being the diameter of the earth)

One benefit of the algorithm is realized when there is a pre-defined data set of points, and the Cartesian co-ordinates of all points from the latitude and longitude have been pre-calculated.

An exemplary embodiment of the calculation module 18 that converts latitude/longitude into the corresponding Cartesian co-ordinates and also does the above-mentioned normalization is:

$x$=Radius*(1.0+cos(latitude)*cos(longitude))

$y$=Radius*(1.0+cos(latitude)*sin(longitude))

$z$=Radius*(1.0+sin(latitude))

In any event, the Cartesian co-ordinates are used to calculate the square of the linear distance between the two geographic locations using the following formula:

$$\text{Distance}^2 = (x_2-x_1)^2 + (y_2-y_1)^2 + (z_2-z_1)^2$$

In order to calculate the various parts of the formula, the square look-up table 22 is used. This reduces the processing requirements needed to calculate this information.

Using the look-up tables to perform the square calculation avoids having to actually perform this calculation that would be more processor intensive. The use of the tables eliminates any arithmetic operation besides addition and subtraction for the calculation.

The result of the square of the linear distance calculation is passed to the linear to surface distance look up module 20, which uses the information in its associated table 26 to convert the square of the linear distance to surface distance that is then output. It will be appreciated that by converting directly from the square of the linear distance directly to the surface distance the need to calculate the square root of the linear distance is avoided which reduces the processing requirements.

An example case is as follows. Assuming the average radius of the earth as 3960 miles, resulting in a diameter of 7920 miles. (x,y,z) for each point is saved in a data set with an accuracy of 1 mile, so x,y,z will be positive numbers without any fractional component, and each of x,y and z can range from 0 to 7920.

To find the distance between two points 1 and 2, the difference between each of x,y, and z is calculated and each difference is squared to get the square of linear distance between the two points, as follows:

$$dx=|x1-x2|$$

$$dy=|y1-y2|$$

$$dz=|z1-z2|$$

$$12=dx2+dy2+dz2$$

Because each of x,y,z can range from 0 to D at the most, the values of dx,dy,dz can range from 0 to D at the most. Therefore, to find the square of dx without actually having to do a multiplication, the square look-up table 22 is used, which has 7920+1 (D+1) entries, where each entry holds the square of the value that is the position of that entry in the table.

For example, the zeroeth entry in the table will contain the value zero, the next entry will contain 1, the next entry at position 2 will contain 4, and the last at position 7920 will contain a value of 7920*7920=62726400. The table will thus contain 7921 entries. Each entry will require 4 bytes of memory, resulting in a memory requirement of 31684 bytes or approximately 32 Kilobytes of computer memory.

Therefore, finding out 12 above includes looking up the squares of dx,dy,dz in the look up table, and adding them up.

Now, using the above square of linear distance, the actual surface distance between the two points needs to be found using the other look up table.

The minimum value of 12 from the above will never be below zero, and the maximum value will never be greater than the square of the diameter of the earth (because no two points on a sphere can be farther apart than being diametrically opposite), which is 7920*7920=62726400

In one embodiment, the linear to surface distance look-up table 24 has 62726400 entries, where each entry contains the surface distance corresponding to that square of linear distance. However, this would require a relatively large amount of memory and the memory requirement can be reduced without much loss of accuracy if only 1 out of every 4 entries in this table is kept. This implies a table size of 62726400/4=15681600, or approximately 16 million entries. Each entry requires 2 bytes that will result in a memory requirement of approximately 32 Megabytes.

The first element in the table 24 will contain the surface distance corresponding to a square of linear distance of zero, the second will have the surface distance corresponding to square of linear distance of 4, the next for 8 and so on. Thus, the position of a desired entry in the table 24 can be obtained by simply dividing the square of linear distance by 4. Since dividing/multiplying by powers of 2 is easily accomplished in a digital computer, this step does not add much to the computation expense.

The above suffices if the accuracy requirement is not great for very large distances (i.e., more than halfway around the earth). Depending upon the accuracy with which the Cartesian co-ordinates (x,y,z) have been saved for each point in our set, the accuracy of the surface distance calculated with this algorithm decreases when the two points are almost diametrically opposite to each other on the earth. For example, if (x,y,z) have been saved with an accuracy of one mile, then for any two points A and B, the surface distance accuracy between A and B is better than 2 miles over almost the entire surface, but suddenly drops off to a 100 miles when B is almost diametrically opposite to A. If high accuracy is required even for large distances then, in one embodiment, a simple symmetry can be utilized as follows.

Figure 3:
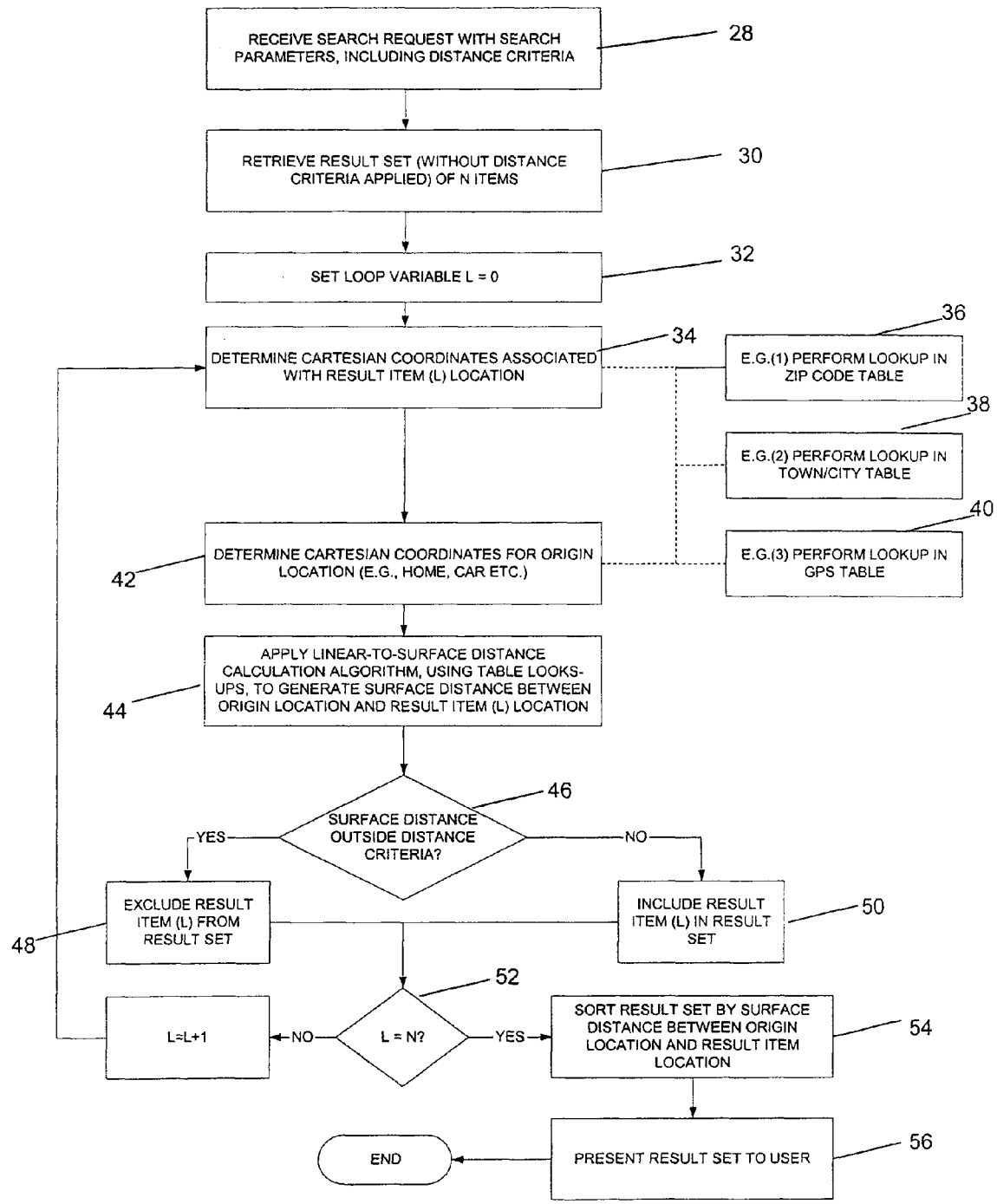
FIG. 3 is a flowchart illustrating a method to retrieve and process a search result set, according to an exemplary embodiment of the present invention.

Referring to FIG. 3, whenever the distance between A and B is more than half-way around the earth, then:

1. Find A', the exact diametrically opposite point to A(x,y,z)

2. This can be found by simple math (where D is the diameter of the earth):

$$X'=2*Radius-X$$

$$Y'=2*Radius-Y$$

$$Z'=2*Radius-Z$$

3. Now find the surface distance S', between A' and B using the original algorithm.

4. Subtract this from the known surface distance between two diametric opposite points on the earth, which gives S, the accurate surface distance between A and B.

The interaction between the modules and the tables seeks to efficiently calculated geographic distance, and avoid complex trigonometric equations to calculate the surface distance between the two geographic locations.

It has been found that one embodiment of the above algorithm allows the computation of distances of 5 million points anywhere on the surface of the Earth from any given point in less than $1/10^{th}$ of a second with an accuracy of less than two miles. Higher accuracy can be achieved with additional computer memory, for example.

The above-mentioned methods may find particular application in the field of on-line commerce such as an online shopping sites, an online auctioning site, an online e-commerce site, an online person-to-person trading site, or the like.

For example, a user wishing to know which stores are within a predetermined radius of their home may enter their home location and the predetermined radius.

The software is then able to calculate the distance between the home location and each of a plurality of stores (or other seller locations) to determine if they are within the predetermined radius.

This is achievable using an embodiment of the present invention due to the efficient manner in which the distance is calculated, as this calculation would otherwise require comparatively larger processing resources.

Another example would be to calculate the distance between two points to determine a delivery charge. This will have application for both a land delivery charge and a sea delivery charge.

FIG. 3 illustrates a method to retrieve and process a search result set, according to an exemplary embodiment of the present invention.

A search request is received 28 with search parameters. The search parameters will typically include an item that is being searched for and a distance criteria being the maximum distance that the located item must be from the origin location.

A result set is retrieved 30 without the distance criteria applied. The results set will be n number of items large.

The search result is obtained using a software implemented search engine.

A loop variable 1 is set at zero 32.

For each item, the Cartesian co-ordinates of the item are located 34. This is either located by performing a look-up in a zip code table 36, performing a look-up in a town/city table 38 or performing a look-up in a GPS table 40.

Figure 4:
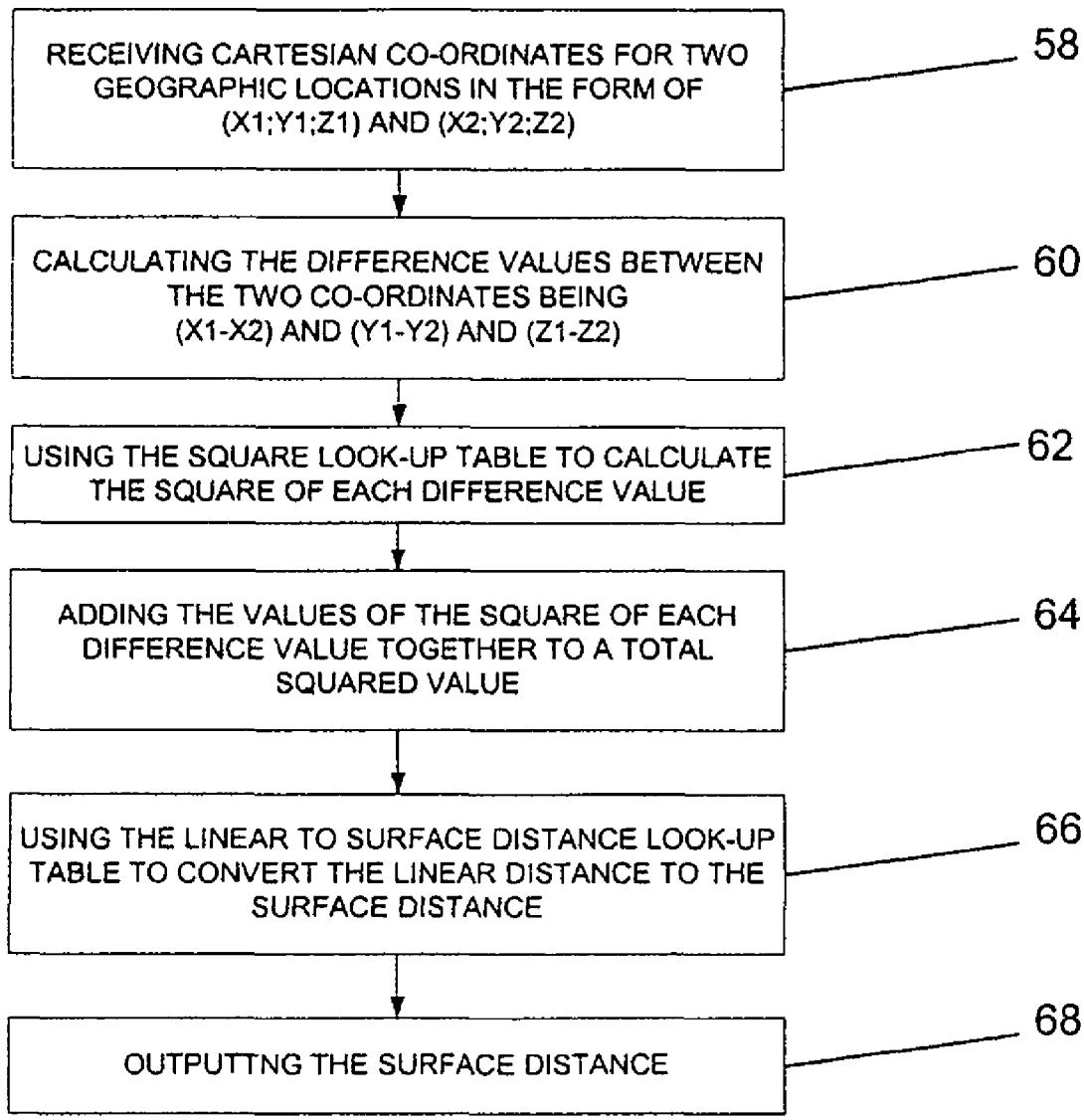
FIG. 4 is a flowchart illustrating an automated method of calculating the surface distance between two geographical locations using Cartesian co-ordinates, according to an exemplary embodiment of the present invention.

The Cartesian co-ordinates for the origin location are calculated 42 and the linear to surface distance calculation algorithm as has been described above and which is also detailed below with reference to FIG. 4 is applied 44.

A decision is then made 46 whether the surface distance is outside the maximum distance specified in the search request. If the surface distance is outside the maximum distance, the item is excluded from the results set 48 while if the surface distance is within the maximum distance then the item is included in the results set 50.

The decision is effected by a software implemented filter module.

The procedure loops through and calculates the distance for each item until the loop variable equals the number of items 52 in which case the distance of each located item has been calculated.

The results set is sorted by surface distance 54 and presented to the user 56.

Referring now to FIG. 4, the figure illustrates an embodiment of calculating the surface distance between two geographical locations.

Cartesian co-ordinates for two geographic locations are received 58 in the form of $(x_1, y_1, z_1)$ and $(x_2, y_2, z_2)$. The difference values between the co-ordinates are calculated 60 being $(x_1-x_2)$ and $(y_1-y_2)$ and $(z_1-z_2)$.

Using the square look-up table 22, the square of each difference value is calculated 62. The square of each difference value is then added together to get a total squared value 64.

Next, the linear to surface distance look-up table 24 is used to convert the total squared linear distance to the surface distance 66 and the surface distance is output 68.

Figure 5:
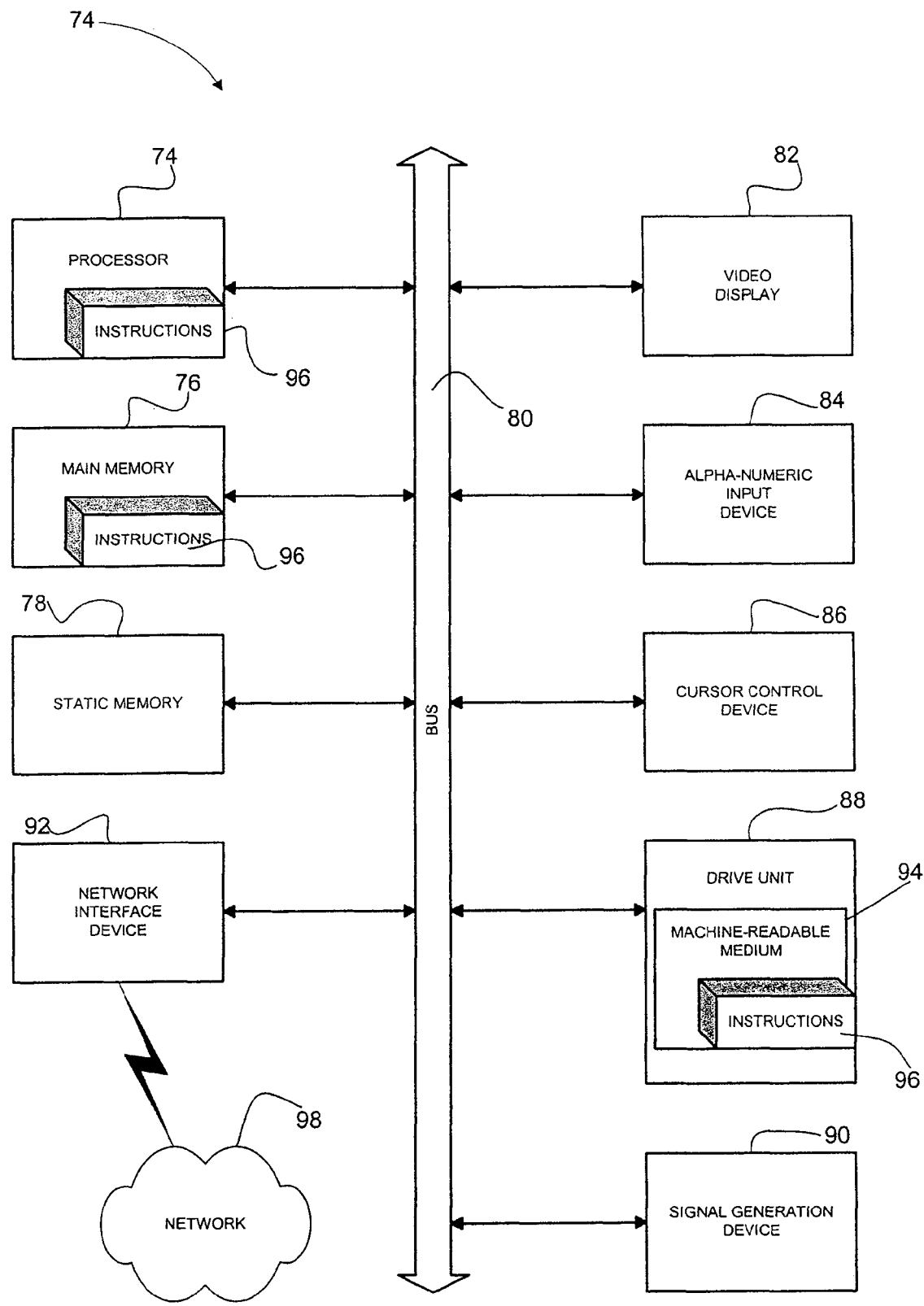
FIG. 5 is an example of a computer system upon which one embodiment of the present invention may be implemented.

FIG. 5 shows a diagrammatic representation of machine in the exemplary form of a computer system 72 within which a set of instructions, for causing the machine to perform any one or more of the above methodologies may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 72 includes a processor 74 (e.g., a central processing unit (CPU) a graphics processing unit (GPU) or both), a main memory 76 and a static memory 78, which communicate with each other via a bus 80. The computer system 72 may further include a video display unit 82 (e.g., a liquid crystal display (LCD) or a cathode ray tube (CRT)). The computer system 72 also includes an alphanumeric input device 84 (e.g., a keyboard), a cursor control device 86 (e.g., a mouse), a disk drive unit 88, a signal generation device 90 (e.g., a speaker) and a network interface device 92.

The disk drive unit 88 includes a machine-readable medium 94 on which is stored one or more sets of instructions (e.g., software 96) embodying any one or more of the methodologies or functions described herein. The software 96 may also reside, completely or at least partially, within the main memory 76 and/or within the processor 74 during execution thereof by the computer system 72, the main memory 76 and the processor 74 also constituting machine-readable media.

The software 96 may further be transmitted or received over a network 98 via the network interface device 92.

While the machine-readable medium 94 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system to calculate the surface distance between two geographical locations have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computerized method comprising:
using a square look-up table and, in at least a portion of one or more of the following acts, one or more processors to determine a surface distance between two geographical locations by:
obtaining normalized ordered n-tuples of Cartesian co-ordinates of the two geographical locations by adding a value of the earth's radius to each respective component of the ordered n-tuples of Cartesian co-ordinates of each of the two geographical locations;
determining the square of the linear distance between the two geographical locations using the normalized ordered n-tuples of Cartesian co-ordinates of the two geographical locations;
converting the calculated square of the linear distance between the two geographical locations to a surface distance value between the two geographical locations by using a square of linear to surface distance look-up table; and
outputting the surface distance value indicative of a surface distance between the two geographical locations.

2. The computerized method of claim 1, further including storing values in the square look-up table for determining the square of a value.

3. The computerized method of claim 2, wherein the determining of the square of the linear distance is by using the square look-up table.

4. The computerized method of claim 1, further including storing values in the square of linear to surface distance look-up table.

5. The computerized method of claim 1, further including receiving a request from a user to determine the distance between two geographical locations.

6. The computerized method of claim 1, further including receiving distance criteria from a user and determining that the surface distance falls within the distance criteria.

7. The computerized method of claim 1, further including, based on a determination that the surface distance is a distance greater than the surface distance of the diameter of the Earth, then recalculating the surface distance by:
   determining a location of a point on the surface of the Earth that is diametrically opposite one of the two geographical locations;
   calculating a further surface distance from the diametrically opposite point to the other of the two geographical locations; and
   subtracting the further surface distance from the surface distance of the diameter of the Earth.

8. The computerized method of claim 1, wherein the two geographical locations are geographical locations associated with at least one of an online commerce and an online shopper, or an online auctioning site and an online bidder.

9. The computerized method of claim 1, wherein the two geographical locations are geographical locations associated with a home and a seller.

10. The computerized method of claim 9, further including determining that a location of the seller is within a predetermined distance from a location of the home.

11. The computerized method of claim 1, further including determining a delivery charge based on a calculated surface distance between two geographical locations.

12. The computerized method of claim 11, wherein the determining of the delivery charge includes at least one of a land delivery charge or a sea delivery charge.

13. A non-transitory machine-readable storage medium comprising instructions, which when executed by a machine, cause the machine to perform the following operations:
   using a square look-up table to determine a surface distance between two geographical locations by,
      obtaining normalized ordered n-tuples of Cartesian co-ordinates of the two geographical locations by adding a value of the earth's radius to each respective component of the ordered n-tuples of Cartesian co-ordinates of each of the two geographical locations;
      determining the square of the linear distance between the two geographical locations using the normalized ordered n-tuples of Cartesian co-ordinates of the two geographical locations;
      converting the calculated square of the linear distance between the two geographical locations to a surface distance value between the two geographical locations by using a square of linear to surface distance look-up table; and
   outputting the surface distance value indicative of a surface distance between the two geographical locations.

14. A computerized system to calculate, using a look-up table, a surface distance between two geographical locations, the system comprising:
   a database to store values in a square of linear to surface distance look-up table for determining a surface distance equivalent of the square of the linear distance value;
   a processor to obtain normalized ordered n-tuples of Cartesian co-ordinates of the two geographical locations by adding a value of the earth's radius to Cartesian co-ordinates X, Y, and Z of each of the two geographical locations, and to calculate the square of the linear distance between the two geographical locations, and to use the normalized ordered n-tuples of Cartesian co-ordinates of the two geographical locations and the square of linear to surface distance look-up table to convert the calculated square of the linear distance between the two geographical locations to a surface distance value between the two geographical locations; and
   an output device to output the surface distance value indicative of a surface distance between the two geographical locations.

15. A computerized system to determine, using a look-up table, a surface distance between two geographical locations, the system comprising:
   hardware means for storing values in a square of linear to surface distance look-up table for determining the surface distance of the square of the linear value;
   means for obtaining normalized ordered n-tuples of Cartesian co-ordinates of the two geographical locations by adding a value of the earth's radius to Cartesian co-ordinates X, Y, and Z of each of the two geographical locations, and calculating the square of the linear distance between the two geographical locations, and to use the normalized ordered n-tuples of Cartesian co-ordinates of the two geographical locations and the square of linear to surface distance look-up table to convert the calculated square of the linear distance between the two geographical locations to a surface distance value between the two geographical locations; and
   hardware means for outputting the surface distance value indicative of a surface distance between the two geographical locations.

16. A method to filter a search result set using distance criteria, the method including:
   receiving a search request with search parameters, the search request including distance criteria;
   retrieving a result using the search parameters, the result including a list of items and associated geographical locations;
   determining normalized ordered n-tuples of Cartesian co-ordinates for an origin location and the geographical location associated with each of the items by adding a value of the earth's radius to Cartesian co-ordinates X, Y, and Z of each of the origin location and the geographical location associated with each of the items;
   determining a surface distance from the origin location to the geographical location of each of the items, using the square of the linear distance between the origin location and the geographical location of each of the items, the normalized ordered n-tuples of Cartesian co-ordinates of the origin location and of the geographical location associated with each of the items, and a square of linear to surface distance look-up table;
   determining whether the surface distance from the origin location to the geographical location of an item falls within the distance criteria;
   in response to determining that the surface distance from the origin location to the geographical location of the item falls within the distance criteria including the item in a result set; and
   outputting the result set.

17. The method of claim 16 further including:
   storing values in a square of linear to surface distance look-up table for determining the surface distance equivalent of a linear distance value;

using a square look-up table to calculate the square of the linear distance value and using the square of linear to surface distance look-up table to convert the calculated square of the linear distance value to a surface distance.

18. A non-transitory machine-readable storage medium comprising instructions, which when executed by a machine, cause the machine to perform a method to filter a search result set using distance criteria, the method comprising:

receiving a search request with search parameters, the search request including distance criteria;

retrieving a result using the search parameters, the result including a list of items and associated geographical locations;

determining normalized ordered n-tuples of Cartesian co-ordinates for an origin location and the geographical location associated with each of the items by adding a value of the earth's radius to Cartesian co-ordinates X, Y, and Z of each of the origin location and the geographical location associated with each of the items;

determining a surface distance from the origin location to the geographical location of each of the items, using the normalized ordered n-tuples of Cartesian co-ordinates of the origin location and of the geographical location associated with each of the items and a square of linear to surface distance look-up table;

determining whether the surface distance from the origin location to the geographical location of an item falls within the distance criteria;

in response to determining that the surface distance from the origin location to the geographical location of the item falls within the distance criteria including the item in a result set; and outputting the result set.

19. A computerized system to filter a search result set using distance criteria, the system comprising:

a search engine to receive a search request with search parameters, the search request including distance criteria, the search engine to retrieve a result set using the search parameters, the result set including a list of items and their geographical locations;

a processor to obtain normalized ordered n-tuples of Cartesian co-ordinates of an origin location and the geographical location of each item in the list of items by adding a value of the earth's radius to Cartesian co-ordinates X, Y, and Z of each of the origin location and the geographical location of each item in the list, and to calculate the square of the linear distance between the origin location and the geographical locations of each item in the list of items, and to use the normalized ordered n-tuples of Cartesian co-ordinates, and a square of linear to surface distance look-up table to convert the calculated square of the linear distance to a surface distance value between the origin location and the geographical locations of each item in the list of items;

a filter to filter out from the result set those items whose surface distances do not fall within the distance criteria; and an output device to output the result set.

* * * * *